United States Patent [19]
Saner

[11] Patent Number: 4,542,659
[45] Date of Patent: Sep. 24, 1985

[54] MASS AND FORCE METER
[75] Inventor: Kaspar Saner, Dübendorf, Switzerland
[73] Assignee: Wirth Gallo Patent AG, Zurich, Switzerland
[21] Appl. No.: 572,146
[22] Filed: Jan. 19, 1984
[30] Foreign Application Priority Data
Feb. 4, 1983 [EP] European Pat. Off. ........ 83810045.1
[51] Int. Cl.[4] ................................................ G01L 1/26
[52] U.S. Cl. ............................ 73/862.38; 73/862.59; 177/210 FP
[58] Field of Search ......... 73/DIG. 1, 862.38, 862.59, 73/517 AV; 177/210 FP
[56] References Cited
U.S. PATENT DOCUMENTS
3,621,713  11/1971  Wirth et al. ..................... 73/862.59
3,724,573   4/1973  Saner ............................. 177/210 FP
3,805,605   4/1974  Saner ............................. 73/862.59
4,088,014   5/1978  Wirth et al. ..................... 73/862.59
4,270,384   6/1981  Saner et al. ..................... 73/862.59
4,497,386   2/1985  Meier ......................... 177/210 FP X Primary Examiner—Charles A. Ruehl
Attorney, Agent, or Firm—Parkhurst & Oliff

[57] ABSTRACT

A mass and force meter with two dynamometers, in which the load to be measured acts at least on one of the dynamometers and is compared with the weight of a reference mass which also acts upon at least one of the dynamometers. The reference mass is linked to a lever pivotally mounted on a horizontal axis of the frame of the meter by guiding means having a reset force so that the reference mass is guided horizontally and parallelly. The guiding means includes a vertical, flat spring and at least one pair of arms connected by resilient guides.

3 Claims, 4 Drawing Figures

MASS AND FORCE METER

The present invention relates to a mass and force meter with two dynamometers, in which the load to be measured acts at least on one of the dynamometers and is compared with the weight of a reference mass which also acts upon at least one of the dynamometers. This reference mass is linked to a lever pivotally mounted on a horizontal axis of the frame of the meter by guiding means having a reset force so that said reference mass is guided horizontally and parallelly.

Meters of this type are known, for instance, from U.S. Pat. No. 3,621,713. In this patent the guiding means consist of guides mounted between the reference mass and the lever. Such guides have proven to be complicated and often unreliable because they are made of several parts.

It is an object of the invention to provide a means to connect the reference mass to the lever which is easy to manufacture and reliable, so that the reference mass is guided resiliently and parallelly in a horizontal plane, i.e. with two degrees of freedom.

It is another object of the invention to provide a mass and force meter with a frame and two dynamometers, in which the load to be measured acts upon at least one of said dynamometers, a reference mass, transmission means transmitting the weight of said reference mass to at least one of said dynamometers, a two-arm lever pivotally mounted in said frame around a horizontal axis, resilient guiding means having a reset force connecting said reference mass to said two-arm lever and guiding it parallelly and horizontally, said guiding means having two parts, the first part comprising a flat spring fitted vertically at one end into said two-arm lever and at the second part comprising at least one outer, rigid arm and at least one inner rigid arm, said outer and inner arms being parallel and connected to each other by means of two parallel, resilient, flat guides, the other end of said flat spring being fitted to said inner, rigid arm.

In such a meter the reference mass, the guiding means and the lever can be manufacturers as a one-piece unit, thereby considerably increasing the reliability of the whole system.

An embodiment of the invention is represented in the enclosed drawing.

Figure 1:
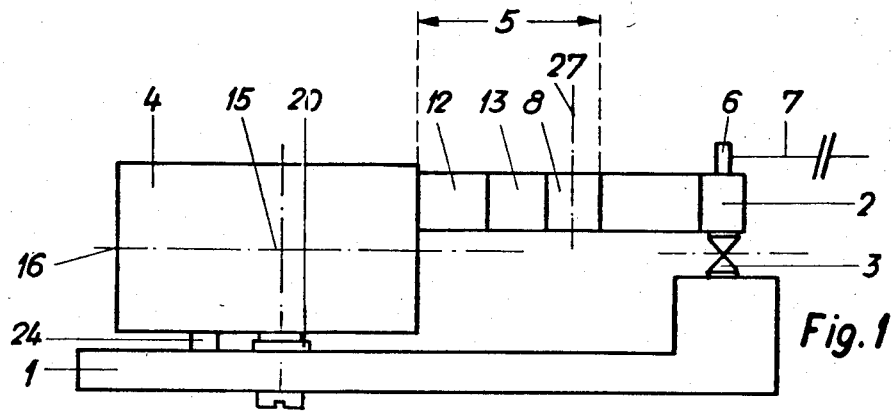
FIG. 1 is a side view of the reference mass and its guiding means.
Figure 2:
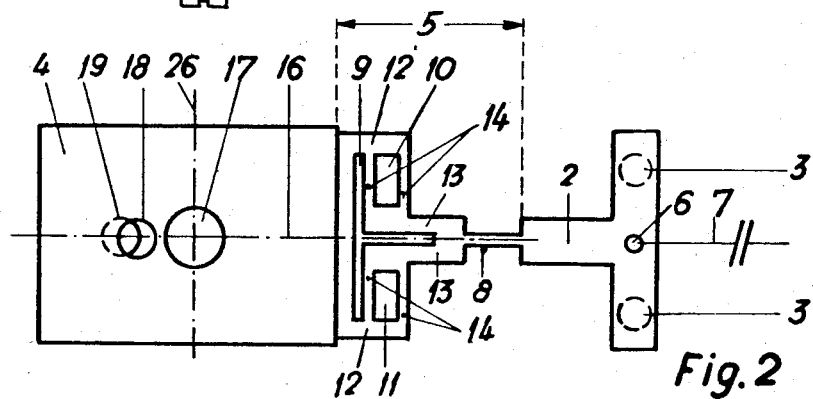
FIG. 2 is a top to bottom view corresponding to FIG. 1, in which the frame of the meter is now shown.
Figure 3:
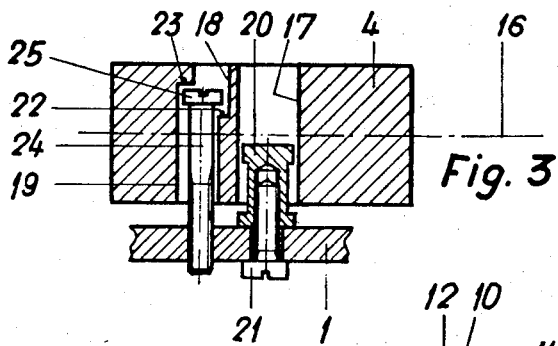
FIG. 3 is a cross section of the reference mass.

In the drawing only those parts of the meter have been represented which are required for understanding the invention. On frame 1 of the mass and force meter a two-arm lever 2 is pivotally mounted by means of crossed, elastic joints 3, so that its axis of rotation is horizontal. A reference mass 4 is connected to this lever 2 by means of resilient guiding means 5. A finger 6 is fixed to lever 2. A transmission element in form of a wire 7 is fixed to finger 6. Its right-hand end is fixed to one or both dynamometers of the meter, as well known in the art. The force acting on wire 7 is a measure of the weight of reference mass 4 for the measuring system (not represented).

Guiding means 5 of reference mass 4 comprise two parts. The first part consists of a vertically mounted flat spring 8 the right-hand end of which is fitted into the horizontal arm of lever 2. It is rigid in vertical direction and resilient in horizontal direction. The second part exhibits a T-shaped slot 9 and two square holes 10 and 11, so as to form two outer, horizontal, rigid arms 12 and two inner, horizontal, rigid arms 13. Flat, resilient, horizontal guides 14 are fitted into parallel arms 12, 13 and connect them pairwise. Arms 13 have a common right-hand end part. The left-hand end of flat spring 8 is fitted into this end part. Guides 14 are perpendicular to arms 12, 13 and to flat spring 8.

The described elements are so dimensioned that the center of gravity 15 of the system comprising reference mass 4, guiding means 5 and lever 2 lays in the horizontal plane through the center of cross joint 3, i.e. including the axis of rotation of lever 2.

Reference mass 4 has three vertical, cylindrical holes 17, 18 and 19. The axis of hole 17 coincides practically with center of gravity 15. A cylindrical stop 20 is fixed to frame 1 and extends within hole 17 so that its top surface is near, or coincides with, the horizontal plane containing center of gravity 15. Stop 20 can be moved horizontally and its position can be fixed by means of a screw 21. Hole 18 exhibits a lower shoulder 22 and hole 19 exhibits an upper shoulder 23. A screw 24 is fixed to frame 1 and extends within holes 18 and 19. Its head 25 is accurately manufactured and acts as two-sided stop for shoulders 22, 23. The height of head 25 is adjustable.

These guiding means operate as follows. Lever 2, guiding means 5 and reference mass 4 remain in horizontal position because they are held in this position by wire 7. Its right-hand end is fixed to the measuring system of the meter which is fixed to frame 1 of the meter, as well known in the art. When unwanted, disturbing forces act upon reference mass 4 in direction of horizontal axis 16, guides 14 are distorted and take on an S-shaped form so that reference mass 4 moves in direction of axis 16. When disturbing forces act upon reference mass 4 in direction of axis 26, it rotates around the vertical, middle axis 27 of flat spring 8. In the first case the disturbing forces exert no action on flat spring 8, in the second case these forces exert no action on guides 14. In both cases the position of stop 20 limits the maximum amplitude of the horizontal movement of reference mass 4. When the disturbing forces cease to exist, guiding means 5 bring back reference mass 4 to its original position. Head 25 of screw 24 and shoulders 22, 23 limit the maximum amplitude of possible vertical movements, as stop 20 is operative in horizontal direction only. Such vertical movements can occur because wire 7 and/or the measuring system to which it is connected and not resilient. If this wire 7 is mounted vertically, then, of course, finger 6 is mounted horizontally and coaxial with axis 16.

This embodiment can be realized as a monoblock structure. Lever 2, guiding means 5 and reference mass 4 can be manufactured as a single piece of casting or by milling a piece of metal.

Figure 4:
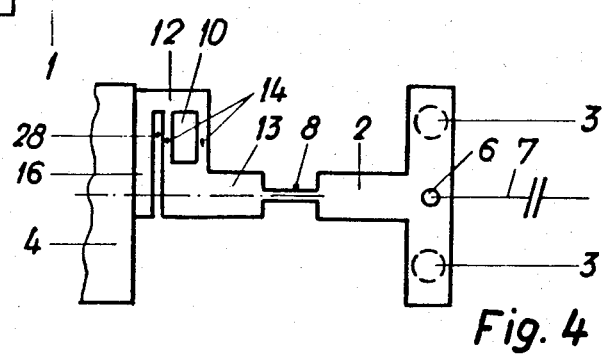
FIG. 4 is a variant.

In FIG. 4 a variant is represented in which the second part of guiding means 5 comprises only one outer and one inner arm 12, respectively 13. The T-shaped slot is replaced by a simple straight slot 28. The operation of these guiding means is the same as described above.

I claim:

1. A mass and force meter with a frame, a reference mass, and force transmission means, said transmission means transmitting the weight of said reference mass, a two-arm lever pivotally mounted in said frame around a horizontal axis, resilient guiding means having a reset force connecting said reference mass to said two-arm lever and guiding it parallelly and horizontally, said guiding means having two parts, the first part comprising a flat spring fitted vertically at one end into said two-arm lever and at the second part comprising at least one outer, rigid arm and at least one inner rigid arm, said outer and inner arms being parallel, resilient, flat guides, the other end of said flat spring being fitted to said inner, rigid arm.

2. A mass and force meter with a frame, a reference mass, and force transmission means, said transmission means transmitting the weight of said reference mass, a two-arm lever pivotally mounted in said frame around a horizontal axis, resilient guiding means having a reset force connecting said reference mass to said two-arm lever and guiding it parallelly and horizontally, the center of gravity of the system comprising said lever, said reference mass and said guiding means lying in a horizontal plane including said horizontal axis, said guiding means having two parts, the first part comprising a flat spring fitted vertically at one end into said two-arm lever and at the second part comprising at least one outer, rigid arm and at least one inner rigid arm, said outer and inner arms being parallel, resilient, flat guides, the other end of said flat spring being fitted to said inner, rigid arm.

3. A mass and force meter with a frame, a reference mass, and force transmission means, said transmission means transmitting the weight of said reference mass, a vertical, cylindrical hole in said reference mass, a vertical cylindrical stop fixed to said frame, extending through said hole, the horizontal position of said stop being adjustable, a two-arm lever pivotally mounted in said frame around a horizontal axis, resilient guiding means having a reset force connecting said reference mass to said two-arm lever and guiding it parallelly and horizontally, the center of gravity of the system comprising said lever, said reference mass and said guiding means lying in a horizontal plane including said horizontal axis, said guiding means having two parts, the first part comprising a flat spring fitted vertically at one end into said two-arm lever and at the second part comprising at least one outer, rigid arm and at least one inner rigid arm, said outer and inner arms being parallel, resilient, flat guides, the other end of said flat spring being fitted to said inner, rigid arm.

* * * * *